United States Patent [19]
Morgan

[11] Patent Number: 5,893,817
[45] Date of Patent: Apr. 13, 1999

[54] LAWN MOWER WITH EXERCISE COMPUTER AND DISPLAY

[76] Inventor: John E. Morgan, R.D. No. 1, Andreas, Pa. 18211

[21] Appl. No.: 08/999,340

[22] Filed: Dec. 29, 1997

[51] Int. Cl.[6] .................................................. A63B 21/00
[52] U.S. Cl. ............................ 482/8; 482/131; 482/137; 482/902
[58] Field of Search ........................ 482/1–9, 51, 54, 482/57, 70, 74, 131, 132, 134, 137, 900–902; 434/247; 56/370, 371; 172/121

[56] References Cited

U.S. PATENT DOCUMENTS

| | | | |
|---|---|---|---|
| 2,266,165 | 12/1941 | Clemson | 56/249 |
| 2,269,920 | 1/1942 | Seaver | 56/249 |
| 3,583,392 | 6/1971 | Frieberger et al. | 128/205 |
| 4,071,892 | 1/1978 | Genzling | 364/424 |
| 4,244,021 | 1/1981 | Chiles, III | 364/413 |
| 4,378,111 | 3/1983 | Tsuchida et al. | 272/73 |
| 4,443,008 | 4/1984 | Shimano | 272/73 |
| 4,643,418 | 2/1987 | Bart | 272/69 |
| 4,708,338 | 11/1987 | Potts | 272/70 |
| 4,735,410 | 4/1988 | Nobuta | 272/72 |
| 4,750,735 | 6/1988 | Furgerson et al. | 272/72 |
| 5,065,414 | 11/1991 | Endou et al. | 377/242 |
| 5,234,392 | 8/1993 | Clark | 482/54 |
| 5,314,389 | 5/1994 | Dotan | 482/3 |
| 5,526,290 | 6/1996 | Kanzaki | 482/3 |
| 5,586,957 | 12/1996 | Wilkinson | 482/74 |

*Primary Examiner*—Glenn E. Richaman
*Attorney, Agent, or Firm*—Paul & Paul

[57] ABSTRACT

A physical exercise apparatus including a hand-propelled lawn mower having an exercise computer for selectively displaying exercise data including speed and the like thereon obtained while mowing a lawn.

7 Claims, 2 Drawing Sheets

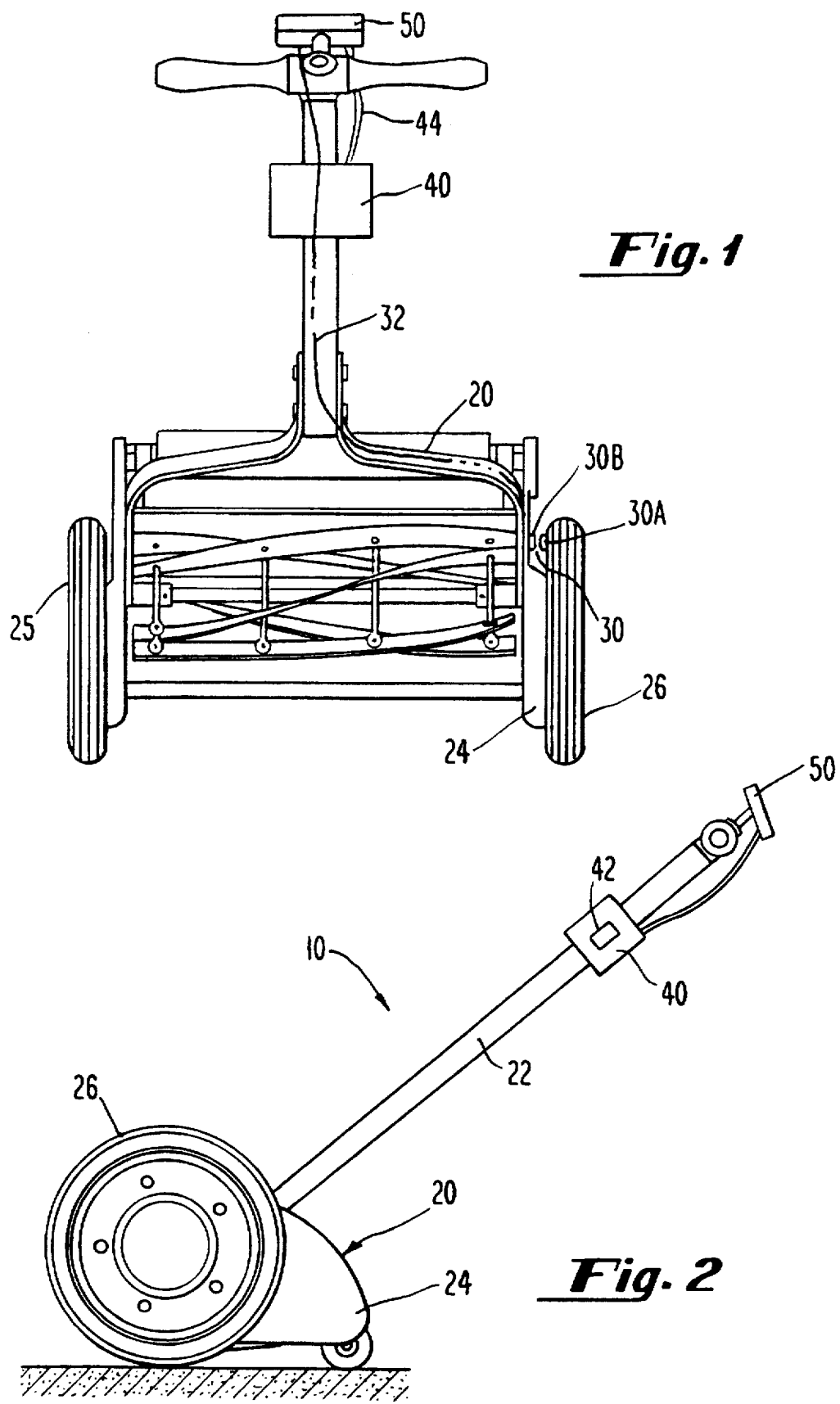

LAWN MOWER WITH EXERCISE COMPUTER AND DISPLAY

BACKGROUND OF THE INVENTION

The present invention relates to a hand-propelled lawn mower that is also a physical exercise appliance which is constructed so as to indicate exercise data, including exercise period of time, speed, calories burned, load pushed, pulse rate, and the like of the user during the mowing of a lawn with the mower.

Hand propelled lawn mowers of various types have been well known for many years. Stationary exercise apparatus on which an exercise computer and display is mounted that measures time, distance, calories burned, pulse rate, and the like are also well known. Additionally, various non-stationary exercise apparatus are known, most often bicycles, have had such computers mounted thereon to measure similar functions are known.

SUMMARY OF THE INVENTION

This invention relates to hand propelled lawn mowers in general and to exercise equipment in general and the use of such hand-propelled lawn mower as a apparatus for exercise that yields quantifiable results of exercise engaged in by a user. A standard, reel-type, hand-propelled lawn mower is preferably used of which the present design modifies or adds to the handle to provide a load sensor that senses the load placed by the user on the mower handle as the lawn mower is propelled across a lawn. Additionally, a speed sensor is used that determines the speed of the lawn mower as it crosses a lawn. The output from the load sensor and speed sensor are input into an exercise computer that tracks time spent and calculates, for example, calories burned and has a read-out that includes, for example, load, calories burned, speed, distance travelled, time of exercise, and the like.

It is therefore an object of the present invention to provide a lawn mower combined with an exercise calculating apparatus.

It is a further object of the present invention to provide a lawn mower combined with an exercise computer and display apparatus that includes sensors including means to determine load placed on the lawn mower by a user.

It is a further object of the present invention to provide a lawn mower combined with an exercise computer and display apparatus that includes sensors including means to determine load placed on the lawn mower by a user that is displayed on the display apparatus.

It is a further object of the present invention to provide a lawn mower combined with an exercise computer and display apparatus that includes sensors including means to determine velocity of the lawn mower.

It is a still further object of the present invention to provide a lawn mower combined with an exercise computer and display apparatus where the exercise computer and display indicates velocity of the lawn mower.

It is a further object of the present invention to provide a lawn mower combined with an exercise computer and display apparatus where the exercise computer and display calculates estimated calories burned by the user based on the load placed on the handles of the lawn mower and the distance travelled.

It is a still further object of the present invention to provide a lawn mower combined with an exercise computer and display apparatus where the exercise computer and display indicates estimated calories burned by the operator of the lawn mower.

It is a still further object of the present invention to provide a lawn mower combined with an exercise computer and display apparatus where the exercise computer and display displays time spent exercising.

It is a still further object of the present invention to provide a lawn mower combined with an exercise computer and display apparatus where the exercise computer and display displays distance travelled while pushing the lawn mower.

Other objects and advantages of the present invention will become apparent from the following description taken in conjunction with the accompanying drawings.

BRIEF DESCRIPTION OF THE DRAWINGS

FIG. 1 is a front view of a lawn mower with exercise computer and display in accordance with one embodiment of the present invention.

FIG. 2 is a side view of the lawn mower with exercise computer and display of FIG. 1.

DESCRIPTION OF THE PREFERRED EMBODIMENT

Figure 3:
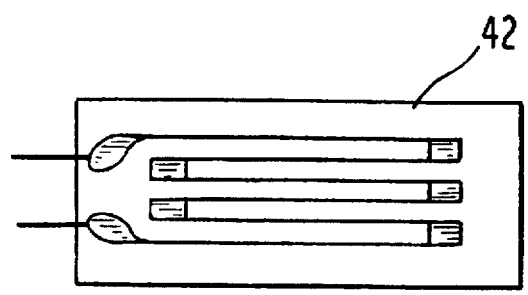
FIG. 3 is a top view of a strain gauge for use with a means to determine load on the handle of the lawn mower of FIG. 1.
Figure 4:
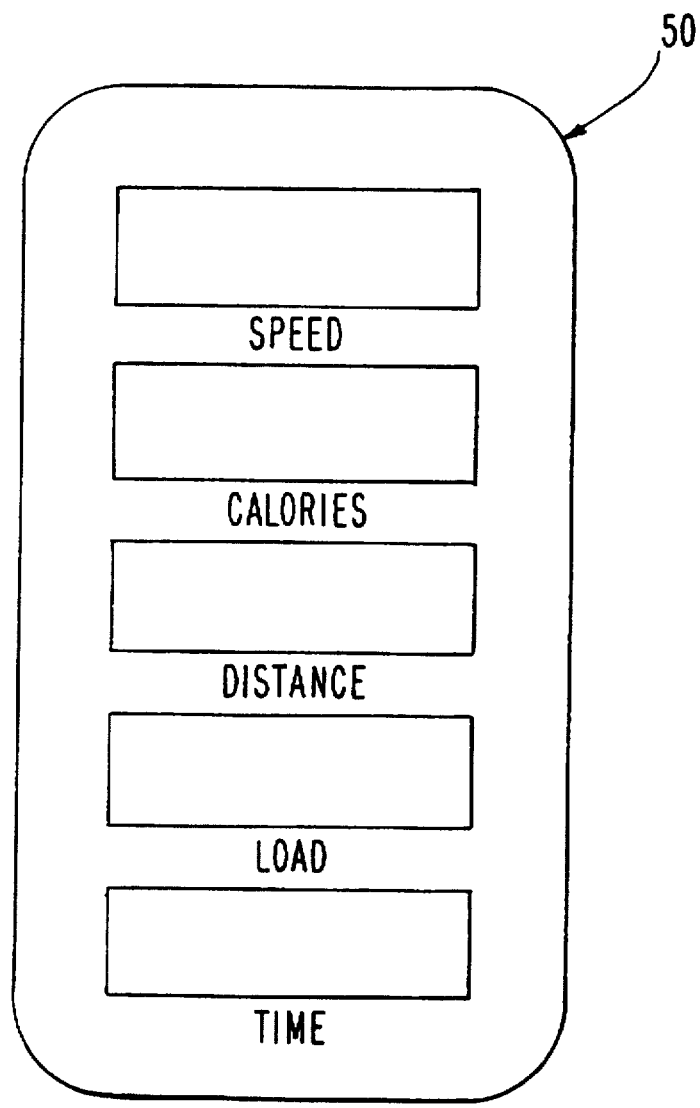
FIG. 4 is a top view of an exercise computer and display as used in the lawn mower of FIG. 1.

Referring now in detail to the drawings, wherein like reference numerals indicate like elements throughout the several views, there is shown in FIGS. 1 and 2 a lawn mower with exercise computer and display 10 in accordance with one preferred embodiment of the present invention. The lawn mower with exercise computer and display 10 comprises a hand-propelled lawn mower 20, a means to determine the velocity 30 of the lawn mower 20, a means to determine load 40 placed on the handle 22 of the lawn mower 20 and an exercise computer and display apparatus 50.

The hand propelled lawn mower 20 can be of a manual type, for example a standard reel-type manual lawn mower as depicted in FIGS. 1 and 2, or possibly a power-type lawn mower with a gas or electric engine (not shown). For the sake of obtaining maximum exercise, the manual reel-type lawn mower is more desirable than a power mower in that lawn mowers of this type generally require more effort to propel across a lawn, thus providing for more exercise.

The means to determine velocity 30 of the lawn mower 20 across a lawn may preferably be of a type typically known for electronic bicycle speedometers. Here, the lawn mower would include a pair of velocity determining means 30A, 30B which cooperate with one another for producing electrical revolution signals in the form of electrical pulses. One of the velocity determining means would be a passive element 30A carried by one of the lawn mower wheels 25, 26, for example the right wheel 26 in FIG. 1. This could be magnet as depicted in FIG. 1 mounted to a side edge of the wheel 26. The other of the pair of velocity determining means could be pick-up means 30B mounted on a stationary point on the frame 24 of the lawn mower 20, adjacent (at one point every time the wheel rotates) the passive means 30A on the wheel which responds to turning of the passive means 30A when it passes the pick-up means 30B and thereby produces an electrical signal.

The pick-up 30B means can take the form of an electrical switch capable of responding to movement of the passive means 30A each time it crosses the pickup means 30B to produce an electrical pulse for each revolution of the wheel 26. It would also be possible for the pickup means 30B to be an induction coil.

The pulsing signal is then electronically transported to the exercise computer and display apparatus 50 described below by wire 32. The signal then enters into the computer and display apparatus 50 which calculates the speed of the lawn mower 20 based on a known circumference or diameter of the wheel 26. The computer and display apparatus 50 has capacity to calculate forward or reverse speed of the lawn mower 20 and calculate total distance traveled. The computer and display apparatus 50 can also take this information and, using the additional factor of time which is determined by the computer, determine average speed, top speed, and the like.

The means to determine velocity 30 of the lawn mower can be any other type known in the art, for example, that shown and described in U.S. Pat. No. 4,071,892, the complete reference of which is incorporated by reference into the present specification, and is not limited to the embodiment described above.

The means to determine load 40 again can be any such means known in the art that can provide an electrical signal through wire 44 that is proportional to the load placed on the handle 22 of the lawn mower 20. Preferably, the means to determine load is one or more simple strain gauge load cells 42 (see FIG. 3) that determine load based on a minute deflection of the handle 20 of the lawn mower. The geometry and location of such a strain gauge load cell can easily be determined by one skilled in the art. Such a strain gauge cell eliminates pivot maintenance and moving parts of a more complicated spring-type means to determine load and provides an electrical output which can be used for direct input into the exercise computer and display apparatus 50. Such a load cell signal output can also easily be calibrated for different handles 22 and work by a user can also be easily calculated.

The load signal enters the computer where it can be displayed and/or enters a calculation for calories burned, and the like.

Alternatively, any means to determine load as is known in the art may be used, such as a spring type mechanical linkage means. However, this type would typically be less desirable due to the increased number of moving parts, particularly in the dirty environment in which a lawn mower operates. Additionally, here, added means to provide an electrical signal must also be provided.

The exercise computer and display apparatus 50 has input means to take the output of the means to determine velocity and the means to determine load, as described above, and enter them into the exercise computer and display apparatus to determine and display various exercise parameters useful to an operator of the lawn mower. The exercise computer and display apparatus has a built-in clock that is used for display and to determine the value of some of the parameters. These parameters may include, but are not be limited to, distance traveled estimated work expended (for example, estimated calories) speed, load on the handles, time spent exercising.

Finally, the present apparatus can be made an after-market add-on in which just the computer, means to determine velocity and means to determine load are sold for installation by a user on any hand-propelled lawn mower. In this case calibration of the means to determine load and the means to determine speed would have to be accomplished by the user.

It will be recognized by those skilled in the art that changes may be made in the above described embodiments of the invention without departing from the broad inventive concepts thereof. It is understood, therefore, that this invention is not limited to the particular embodiments disclosed, but is intended to cover all modifications which are within the scope and spirit of the invention as defined by the appended claims.

I claim:

1. A physical exercise apparatus comprising a hand-propelled lawn mower having an exercise computer for selectively displaying exercise data thereon obtained from data from sensors on the lawn mower while mowing a lawn.

2. A physical exercise apparatus comprising a hand-propelled lawn mower having at least one wheel and a handle, a means to determine velocity of the lawn mower having an output signal for determining wheel speed, a means to determine load on the handle of the lawn mower having an output signal in proportion to the load, and an exercise computer for selectively displaying exercise data thereon obtained from the means to determine load and the means to determine velocity of the lawn mower while mowing a lawn.

3. A physical exercise apparatus comprising:
 a) a hand-propelled lawn mower having a handle for hand-propelling the lawn mower over an area of grass,
 b) an exercise computer for selectively displaying exercise data,
 c) a load sensor electronically attached to the exercise computer, adjacent the handle of the lawn mower for sending a signal of a measured load by an operator of the apparatus on the handle of the lawn mower to the exercise computer,
 whereby the exercise computer displays exercise data, including data determined based on load on the handle of the lawn mower.

4. The physical exercise apparatus of claim 3, wherein the load sensor is a strain gauge cell.

5. A physical exercise apparatus comprising:
 a) a hand-propelled lawn mower having a handle for hand-propelling the lawn mower over an area of grass,
 b) an exercise computer for selectively displaying exercise data,
 c) means to determine the rate of rotation of at least one wheel of the lawn mower, said means operatively connected to the exercise computer,
 d) whereby the exercise computer calculates speed of the lawn mower based on input variables including the diameter of the at least one wheel of the lawn mower and the exercise computer displays exercise data, including data determined based on speed of the lawn mower.

6. A physical exercise apparatus comprising:
 a) a hand-propelled lawn mower having a handle for hand-propelling the lawn mower over an area of grass,
 b) an exercise computer for selectively displaying exercise data,
 c) a load sensor electronically attached to the exercise computer, adjacent the handle of the lawn mower for sending a signal of a measured load placed by an operator of the apparatus on the handle of the lawn mower to the exercise computer,
 d) means to determine the rate of rotation of at least one wheel of the lawn mower
 e) whereby the exercise computer calculates speed of the lawn mower based on input variables including the diameter of the at least one wheel of the lawn mower and the exercise computer displays exercise data, including data determined based on load on the handle of the lawn mower and the speed of the lawn mower.

7. The physical exercise apparatus of claim 6, wherein the load sensor is a strain gauge cell.

* * * * *